United States Patent

Clover, Jr.

[15] 3,673,582

[45] June 27, 1972

[54] BUBBLE DOMAIN SONIC PROPAGATION DEVICE

[72] Inventor: Richmond Bennett Clover, Jr., Cranbury, N.J.

[73] Assignee: RCA Corporation

[22] Filed: May 17, 1971

[21] Appl. No.: 143,864

[52] U.S. Cl. ............340/174 MS, 340/174 TF, 340/174 VA, 340/174 MC

[51] Int. Cl. ....................................G11c 19/00, G11c 11/14

[58] Field of Search ..............................340/174 MS, 174 TF

[56] References Cited

UNITED STATES PATENTS

| | | | |
|---|---|---|---|
| 3,145,372 | 8/1964 | Suits et al. | 340/174 MS |
| 3,339,188 | 8/1967 | Weinstein | 340/174 MS |
| 3,440,625 | 4/1969 | Weinstein | 340/174 MS |
| 3,434,119 | 3/1969 | Onyshkevych | 340/174 MS |
| 3,465,305 | 9/1969 | Cohler et al. | 340/174 MS |
| 3,484,759 | 12/1969 | Hadden, Jr. | 340/174 MS |
| 3,460,116 | 8/1969 | Bobeck et al. | 340/174 TF |
| 3,508,225 | 4/1970 | Smith | 340/174 TF |
| 3,534,341 | 10/1970 | Sherwood et al. | 340/174 TF |

*Primary Examiner*—Stanley M. Urynowicz, Jr.
*Attorney*—H. Christoffersen

[57] ABSTRACT

A single wall magnetic domain or bubble is advanced in a sheet of magnetic material such as an orthoferrite by means of a sonic stress wave propagated through a contiguous channel-defining member of anisotropic, magnetostrictive material such as permalloy. A sonic stress wave propagated through the permalloy member causes a propagated region in which the direction of magnetization in the permalloy is partially rotated. The propagated region of rotated magnetization urges the magnetic bubble in the same direction along a path in the orthoferrite.

9 Claims, 3 Drawing Figures

INVENTOR.
Richmond B. Clover, Jr.
BY
Carl V. Olson
ATTORNEY

BUBBLE DOMAIN SONIC PROPAGATION DEVICE

FIELD OF THE INVENTION

The invention relates to data processing, and, more particularly, to arrangements employing magnetic media in which single wall domains can be propagated in the performance of computer logic and memory functions.

BACKGROUND OF THE INVENTION

A single wall domain or bubble is a magnetic domain bounded by a domain wall which closes on itself and assumes the shape of a cylinder in a sheet of magnetic material such as a rare earth orthoferrite. A bias magnetic field is provided having a polarity to constrict a domain and ensure its movement as a stable entity.

Single wall domains or bubbles may be moved from one position to another by localized magnetic fields. The controlled movement of bubbles may be accomplished by a pattern of local electric conductor loops which are energized by multi-phase current waveforms in a manner to successively propagate a bubble from position to position along a desired path. Another method of propagating magnetic bubbles involves the use of a pattern of local permalloy elements having a geometry which functions in cooperation with a rotating magnetic field supplied by coils surrounding the entire apparatus to cause bubbles to move along a path defined by the local permalloy elements. Further information on magnetic domains is contained in an article "Magnetic Bubbles — A Technology in the Making" by Harry R. Karp, appearing on pages 83–89 in the Sept. 1, 1969 issue of Electronics magazine.

The known means for propagating magnetic bubbles have practical disadvantages. Apparatus using phased currents in local conductor loops is expensive and difficult to construct in small dimensions because of the complexity of the conductor patterns and the driving electronics. Designs using a pattern of local permalloy elements require very high electric power in large surrounding coils for the generation of the externally-supplied rotating magnetic field, particularly where high operating frequencies are desired.

BRIEF DESCRIPTION OF THE INVENTION

The disadvantages of the known methods of propagating single wall domains in a magnetic sheet may be avoided by utilizing a propagated sonic stress wave to advance the domain walls along a desired path. The path is defined by an anisotropic, magnetostrictive magnetic means through which sonic stress waves are propagated. The propagated stress wave causes a propagation of a zone of partially-rotated magnetization, which in turn causes a propagation of single wall domains.

DETAILED DESCRIPTION

Figure 1:
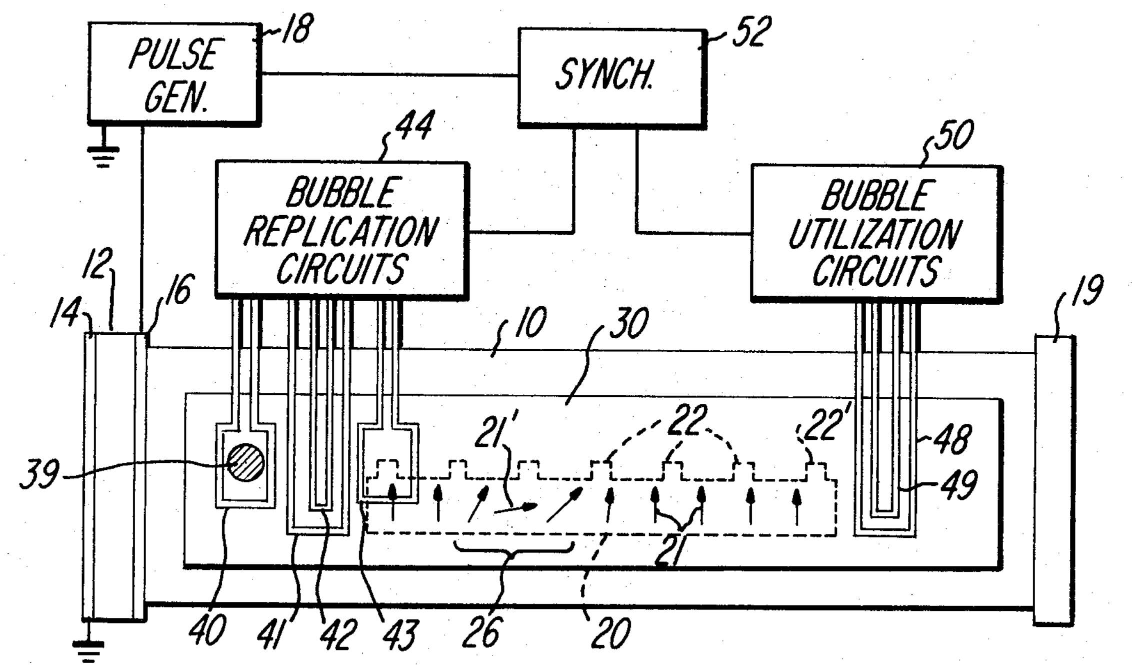
FIG. 1 is a plan view of a domain propagation arrangement constructed according to the teachings of the invention.
Figure 2:
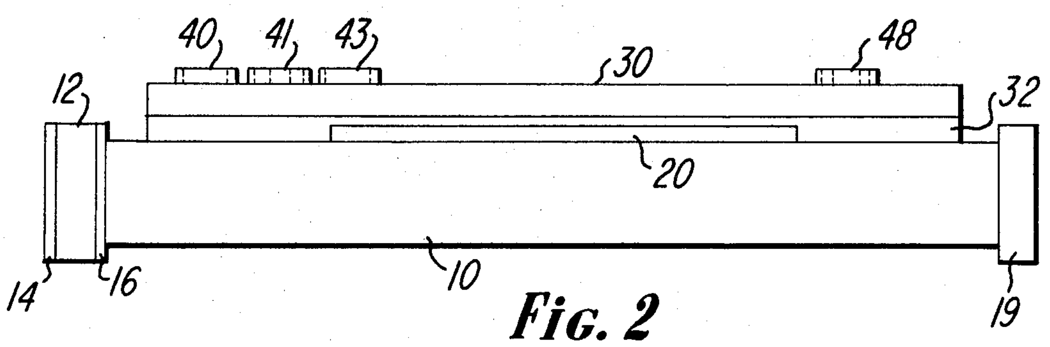
FIG. 2 is an edge view of the arrangement shown in FIG. 1.

The domain propagation device shown in FIGS. 1 and 2 includes an elongated sonic stress wave conductor 10 which may be made of glass or quartz having a thickness of 1/16 inch or less. The stress wave conductor 10 is provided at one end with an electromechanical piezoelectric transducer 12 having electrodes 14 and 16 connected to a pulse wave generator 18. The opposite end of the stress wave conductor is provided with an acoustic termination 19.

An anisotropic magnetostrictive magnetic member 20 is arranged in intimate physical contact with the stress wave conductor 10. The magnetic member 20 preferably is made of a magnetic material such as permalloy which is anisotropic, has a high coefficient of magnetostriction, a high permeability and a low coercive force. The magnetic member 20 may be deposited, as by evaporation, onto the stress wave conductor 10 as a single elongated member having periodic irregularities 22 defining successive domain arresting points. The irregularities 22 may be protrusions having the rectangular geometry shown in the drawing, or having other shapes such as triangular. Alternatively, the magnetic member 20 may be constructed in the form of a plurality of discrete magnetic elements arranged along a line. The elements may have geometries similar to the geometries of permalloy overlays used in prior art systems of domain propagation where the propagating force is provided by an externally-supplied rotating magnetic field from large coils.

The permalloy magnetic member 20 may be deposited as a film, with a thickness of a few or several thousand angstroms, in the presence of a permanent magnetic field, so that the resulting anisotropic magnetic film has flux lines 21 along easy axis transverse to the longitudinal dimension of the film, and lying in the plane of the film. When the film 20 is subjected to stress, the direction of magnetization is rotated to directions as shown at 21'.

The device shown also includes a sheet 30 about one to three mils thick of magnetic material of a type in which single wall domains or bubbles may be established and propagated. For example, a representative material is a rare earth orthoferrite such as thulium orthoferrite ($TmFeO_3$). A sheet of material of this type is characterized by a preferred direction of magnetization (easy axis) normal to the plane of the sheet. A magnetic bubble in the material consists of a cylindrical volume in which the magnetic lines extend in one direction normal to the sheet, with magnetic lines in surrounding regions of the sheet extending in the opposite direction also normal to the sheet. The bubble is substantially stable in size as a result of a predetermined constant magnetic bias applied normal to the orthoferrite sheet by means (not shown) such as an electric coil or a permanent magnet. The orthoferrite sheet 30 is positioned contiguous with the permalloy member 20 so that magnetic effects propagated in the permalloy member 20 can affect a propagation of bubbles in the orthoferrite sheet 30. The construction may be one in which the permalloy 20 and the orthoferrite 30 are supported in close but spaced relation by supported means (not shown). Alternatively, the orthoferrite 30 may be supported on the permalloy film 20 and the glass sonic conductor 10 by means of a layer 32 of supporting insulating material such as silicon dioxide, $SiO_2$. The construction must be such that the orthoferrite 30 does not substantially interfere with the orderly propagation of sonic stress waves from the transducer 12 through the sonic conductor 10 and permalloy film 20 to the acoustic termination 19.

The top surface of the orthoferrite sheet 30 is provided with loop conductors of known construction for the purpose of generating or replicating bubbles, and for the purpose of utilizing bubbles that have been propagated from their point of origin. Loop conductors 40, 41, 42 and 43 are provided on the orthoferrite 30 and are connected to bubble replication circuits 44 for the purpose of generating bubbles at a position from which they can be propagated toward a utilization means. The loop conductor 40 carries a current which stablizes the position of a permanently-present bubble 39. By appropriately varying the currents in the conductor loops, the bubble present in loop 40 is transferred to loop 41, and then the bubble is split or cut into two bubbles, one of which returns to loop 40 and the other of which moves to loop 43. The newly created bubble in loop 43 is in position to be propagated by a stress wave, in a manner to be described, toward a bubble utilization means.

A bubble utilization means includes conventional loop conductors 48 and 49 which are on the orthoferrite sheet 30 and which are electrically connected to bubble utilization circuits 50. A bubble arriving at the location of the final protuberance 22' is attracted to the location of conductor loop 48 by a current passed through the loop. The current is then varied to first expand the bubble and then contract the bubble until it disappears. During this process, the bubble induces a voltage in sense conductor loop 49 which is recognized by the utilization circuits 50. The pulse generator 18, replication circuits 46 and the utilization circuits 50 are synchronized in their operation by means of a synchronizing circuit 52. The conductor loops illustrated for utilizing bubbles may alternatively be replaced by other known constructions for the same purpose, such as one utilizing the Hall effect or utilizing the magnetoresistance effect.

Figure 3:
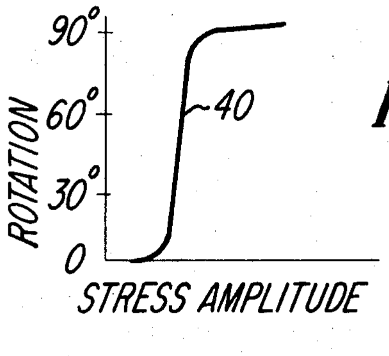
FIG. 3 is a chart illustrating a relationship between stress and magnetization in an anisotropic material.

FIG. 3 is a chart illustrating the increasing amount of angular rotation of magnetization in a thin permalloy film which results when the film is subjected to an increasing physical stress. In the absence of stress, the magnetization in the permalloy film has one or the other of two directions along the easy axis of the material. Curve 40 shows how the magnetization rotates from the easy axis direction in terms of the amplitude of stress applied to the magnetic spot when the stress is effective in a direction at right angles to the easy axis. When the sonic pulse wave is propagated in the longitudinal mode, the direction of effective stress and strain is the same as the direction of propagation. This is the condition illustrated, by way of example, in the device of FIGS. 1 and 2. The lines 21 of magnetization are shown with directions they have when the stress wave or pulse has reached a position 26 about one-quarter of the way along the permalloy film 20. The sonic stress wave may be produced by a single pulse of electric energy applied to the transducer 12, or may consist of a succession of pulses, or a burst of high frequency oscillations.

OPERATION

In the operation of the domain propagation device shown in FIGS. 1 and 2, the bubble replication means 40 through 44 is employed to establish a bubble at the location determined by the conductor loop 43. The transducer 12 is then energized from the pulse generator 18 to launch a sonic stress wave through the stress wave conductor 10 and the permalloy film 20 toward the termination 18. Initially the magnetization in the film 20 is along the easy axis direction transverse to the longitudinal dimension of the film. When the sonic stress wave reaches and passes through the film 20, the stress imparted to the permalloy film 20 tends to rotate the magnetization in the film from a direction along the easy axis of the material to a direction having an angle such as up to 90° therewith. The moving zone of angularly rotated magnetization in the permalloy film 20 tends to push the bubble along the path in the orthoferrite 30 defined by the irregular edge of the permalloy film 20. Adjacent protuberances on film 20 may be spaced apart more than or less than the diameter of a bubble.

The moving region of angularly rotated magnetization urges the bubble to the right in the drawing where it tends to be arrested at the next closest protuberance 22 by the magnetic field concentrations at the corners thereof. Thereafter, the next following sonic stress pulse or burst causes the bubble to be propagated to the next following protuberance 22. This action is repeated to step the bubble along from protuberance to protuberance until a position is reached over the final protuberance 22' adjacent to conductor coil 48. The bubble utilization means 48, 49 and 50 are then operated in a known appropriate manner to cause the presence of the bubble to be detected, and then eliminated.

The path over which the bubble is propagated may be much longer and have many more arresting points than illustrated in the drawing, and a serial succession of bubbles may be simultaneously propagated in the manner of the propagation of digital information bits through a shift register or a serial memory. The replication circuit 44 may create bubbles in time slots corresponding to "1" information bits, and omit the creation of bubbles in time slots representing binary "0"s. Various known means for sensing and utilizing the propagated bubbles may be employed.

The described construction is easy to construct and operate compared with presently known arrangements. For example, the propagation by stress pulses does not require the use of a large number of phased conductor loops between the replication and utilization ends, as has previously been necessary. The described arrangement is also simpler than known arrangements involving an overlay of permalloy elements and high power means for externally generating a rotating magnetic field completely surrounding the entire apparatus. Additionally, the described construction is capable of a higher speed of bubble propagation to provide a bit rate in the megacycle range, rather than in the few-hundred-kilocycle range of prior arrangements.

What is claimed is:

1. In combination,
- a sheet of magnetic material in which single wall domains can be moved,
- magnetic means contiguous with said sheet to define a propagation channel in the sheet for said domains, and
- means to propagate a sonic stress wave through said magnetic means to propagate domains along said propagation channel.

2. The combination of claim 1 wherein said sheet comprises a material having a preferred direction of magnetization normal to the plane of the sheet.

3. The combination as defined in claim 1 wherein said magnetic means comprises an anisotropic magnetic material having a preferred direction of magnetization parallel with said sheet.

4. The combination as defined in claim 1 wherein said magnetic means is permalloy.

5. The combination as defined in claim 1 wherein said channel-defining magnetic means includes periodic irregularities defining successive domain arresting points.

6. The combination as defined in claim 1 wherein said means to propagate a sonic stress wave through said magnetic means comprises a stress wave conductor in intimate physical contact with said magnetic means, and an electro-mechanical transducer mounted on said stress wave conductor.

7. The combination as defined in claim 6 wherein said magnetic means is a permalloy magnetic film deposited on said stress wave conductor.

8. The combination as defined in claim 1 and, in addition, means including electric current conductors to supply magnetic domain bubbles to one end of said propagation channel.

9. The combination as defined in claim 1 and, in addition, means including electric current conductors to sense the presence of magnetic domain bubbles arriving at a point along said propagation channel.

* * * * *